(12) United States Patent
Oren et al.

(10) Patent No.: US 8,985,913 B2
(45) Date of Patent: Mar. 24, 2015

(54) CUTTING TOOL HOLDER WITH INTERNAL COOLANT PASSAGE HAVING A COMPRESSIBLE MEMBER

(71) Applicant: Iscar, Ltd., Tefen (IL)

(72) Inventors: Vitaly Oren, Kiryat Ata (IL); Roman Shpilkin, Haifa (IL)

(73) Assignee: Iscar, Ltd., Tefen (IL)

( * ) Notice: Subject to any disclaimer, the term of this patent is extended or adjusted under 35 U.S.C. 154(b) by 254 days.

(21) Appl. No.: 13/675,233

(22) Filed: Nov. 13, 2012

(65) Prior Publication Data
US 2014/0133924 A1 May 15, 2014

(51) Int. Cl.
B23B 27/10 (2006.01)
B23B 27/16 (2006.01)
B23B 29/04 (2006.01)

(52) U.S. Cl.
CPC .............. *B23B 27/10* (2013.01); *B23B 29/043* (2013.01); *B23B 2205/02* (2013.01); *B23B 2250/12* (2013.01)
USPC .............. 407/11; 407/107; 407/91; 407/109; 408/56

(58) Field of Classification Search
CPC ............................... B23B 27/10; B23B 27/16
USPC ........ 407/11, 110, 117, 91, 107, 109; 408/56, 408/57
See application file for complete search history.

(56) References Cited

U.S. PATENT DOCUMENTS

| 3,323,195 | A | * | 6/1967 | Vanderjagt | 407/11 |
|---|---|---|---|---|---|
| 3,889,520 | A | * | 6/1975 | Stoferle et al. | 73/37.5 |
| 4,621,547 | A | * | 11/1986 | Yankoff | 82/1.11 |
| 4,848,198 | A | | 7/1989 | Royal et al. | |
| 5,346,335 | A | * | 9/1994 | Harpaz et al. | 407/11 |
| 5,402,696 | A | * | 4/1995 | Hecht et al. | 82/158 |
| 5,718,156 | A | * | 2/1998 | Lagrolet et al. | 82/1.11 |
| 5,833,403 | A | * | 11/1998 | Barazani | 407/101 |
| 6,299,388 | B1 | * | 10/2001 | Slabe | 407/11 |
| 6,814,526 | B2 | * | 11/2004 | Shiraiwa et al. | 407/110 |
| 7,246,974 | B2 | * | 7/2007 | Hansson et al. | 407/109 |
| 7,273,331 | B2 | * | 9/2007 | Giannetti | 407/11 |
| 7,568,864 | B2 | | 8/2009 | Sjöö | |
| 7,641,422 | B2 | | 1/2010 | Berminge et al. | |
| 7,959,384 | B2 | | 6/2011 | Breisch | |

(Continued)

FOREIGN PATENT DOCUMENTS

| EP | 1533056 A1 | * | 5/2005 |
|---|---|---|---|
| JP | 6031502 | | 2/1994 |

(Continued)

*Primary Examiner* — Sunil K Singh
*Assistant Examiner* — Sara Addisu
(74) *Attorney, Agent, or Firm* — Womble Carlyle

(57) ABSTRACT

A cutting tool holder has a holder body and upper and base jaws. An insert receiving pocket is defined between the upper and base jaw, for receiving a cutting insert therein. A resilience recess allows the upper jaw to deflect toward the base jaw. An upper jaw coolant channel has an upper jaw inlet, opening out to the resilience recess, and an upper jaw outlet, opening out to a front end of the upper jaw. A holder body coolant channel has a holder body outlet, opening out to the resilience recess, spaced apart from the upper jaw inlet. A compressible tool coolant plug, made of compressible material, is inserted into the resilience recess. The plug has a plug coolant channel opening out toward the upper jaw inlet and the holder body outlet, forming a fluid path from the holder body coolant channel to the upper jaw coolant channel.

23 Claims, 3 Drawing Sheets

(56) References Cited

U.S. PATENT DOCUMENTS

| | | | |
|---|---|---|---|
| 8,388,268 B2* | 3/2013 | Henry et al. | 407/11 |
| 2003/0082018 A1* | 5/2003 | Kraemer | 407/11 |
| 2005/0129471 A1* | 6/2005 | Englund | 407/101 |
| 2006/0140728 A1* | 6/2006 | Giannetti | 407/11 |
| 2007/0283794 A1* | 12/2007 | Giannetti | 82/158 |
| 2008/0131215 A1* | 6/2008 | Sjoo | 407/110 |
| 2010/0196105 A1* | 8/2010 | Amstibovitsky et al. | 407/11 |
| 2011/0070037 A1* | 3/2011 | Baker et al. | 407/11 |
| 2012/0230780 A1 | 9/2012 | Henry et al. | |
| 2013/0078043 A1* | 3/2013 | Henry et al. | 407/11 |
| 2013/0129428 A1* | 5/2013 | Henry et al. | 407/11 |
| 2013/0202372 A1* | 8/2013 | Hecht, Gil | 407/107 |
| 2014/0064862 A1* | 3/2014 | Breisch | 407/11 |

FOREIGN PATENT DOCUMENTS

| | | |
|---|---|---|
| JP | 6126510 | 5/1994 |
| JP | 7237008 | 9/1995 |
| JP | 03317783 | 8/2002 |
| JP | 2010-179380 | 8/2010 |
| WO | 2012/130857 | 10/2012 |

* cited by examiner

CUTTING TOOL HOLDER WITH INTERNAL COOLANT PASSAGE HAVING A COMPRESSIBLE MEMBER

FIELD OF THE INVENTION

The present invention relates to cutting tools with resiliently clamped cutting inserts, in general, and to cutting tools with coolant passage arrangements, in particular.

BACKGROUND OF THE INVENTION

Cutting tools with a holder and a cutting insert resiliently clamped therein, are employed for metal cutting operations, such as turning and grooving operations. The cutting insert is clamped in an insert receiving pocket between an upper jaw and a lower jaw, which are fastened together by a tightening screw. Some cutting tools have arrangements for providing tool coolant fluid toward the cutting edge of the cutting insert, in order to cool down the cutting edge and evacuate metal chips cut out of the work piece. There are arrangements for providing tool coolant fluid toward different locations of the cutting insert, for example, emerging from above the cutting edge, from below the cutting edge, to the sides of the cutting edge, from behind the cutting insert, etc.

Cutting tools with tool coolant arrangements are shown, for example, in JP3317783, JP6031502, JP6126510, JP7237008, JP2010-179380, WO2012130857, U.S. Pat. Nos. 4,848,198, 7,568,864, 7,641,422, 7,959,384, and US2012230780.

It is an object of the subject matter of the present application to provide an improved novel cutting tool holder, having an internal tool coolant passage for providing coolant toward the cutting edge of the cutting insert, through the upper jaw of the insert receiving pocket.

SUMMARY OF THE INVENTION

In accordance with the subject matter of the present application, there is provided a cutting tool holder, comprising:
 a holder body;
 an upper jaw and a base jaw, defining an insert receiving pocket therebetween, located forward of the holder body, the upper jaw and the base jaw being coupled with the holder body, the upper jaw having a front end and a rearward end;
 a resilience recess located adjacent the rearward end of the upper jaw, the resilience recess being bounded by a resilience recess wall extending transversely to the insert receiving pocket;
 a holder body coolant channel having a holder body inlet and a holder body outlet, the holder body outlet located forward of the holder body inlet and opening out to the resilience recess wall;
 an upper jaw coolant channel having an upper jaw inlet opening out to the resilience recess wall and spaced apart from the holder body outlet, and an upper jaw outlet opening out to the front end of the upper jaw; and
 a compressible tool coolant plug having a plug peripheral surface and a plug coolant channel passing through the tool coolant plug and opening out to the plug peripheral surface at a plug inlet and a plug outlet;
 wherein the tool coolant plug is located within the resilience recess, with the plug inlet facing the holder body outlet, and the plug outlet facing the upper jaw inlet, and
 when the upper jaw resiliently deflects toward the base jaw, the resilience recess wall compresses the tool coolant plug, and the plug coolant channel forms a fluid path from the holder body coolant channel to the upper jaw coolant channel.

In accordance with another embodiment of the present application, there is provided a cutting tool comprising the cutting tool holder as described above, and a cutting insert clamped in the insert receiving pocket of the cutting tool holder. The cutting tool may have a cutting tool coolant fluid inserted into the holder body coolant channel, and advance through the plug coolant channel, into the upper jaw coolant channel, and toward the cutting insert. In a particular embodiment, the cutting tool coolant fluid is sprayed toward the cutting edge of the cutting insert.

In accordance with a further embodiment of the present application, there is provided a cutting tool holder, comprising:
 a holder body;
 an upper jaw and a base jaw coupled with the holder body, the upper jaw having a front end and a rearward end;
 a resilience recess located adjacent the rearward end of the upper jaw;
 a holder body coolant channel having a holder body outlet in fluid communication with the resilience recess;
 an upper jaw coolant channel having an upper jaw inlet in fluid communication with the resilience recess; and
 a compressible tool coolant plug located within the resilience recess and having a plug coolant channel passing therethrough;
 wherein when the upper jaw resiliently deflects toward the base jaw, the tool coolant plug is compressed and the plug coolant channel forms a fluid path from the holder body coolant channel to the upper jaw coolant channel.

BRIEF DESCRIPTION OF THE DRAWINGS

For a better understanding of the present invention and to show how the same may be carried out in practice, reference will now be made to the accompanying drawings, in which.

Figure 1:
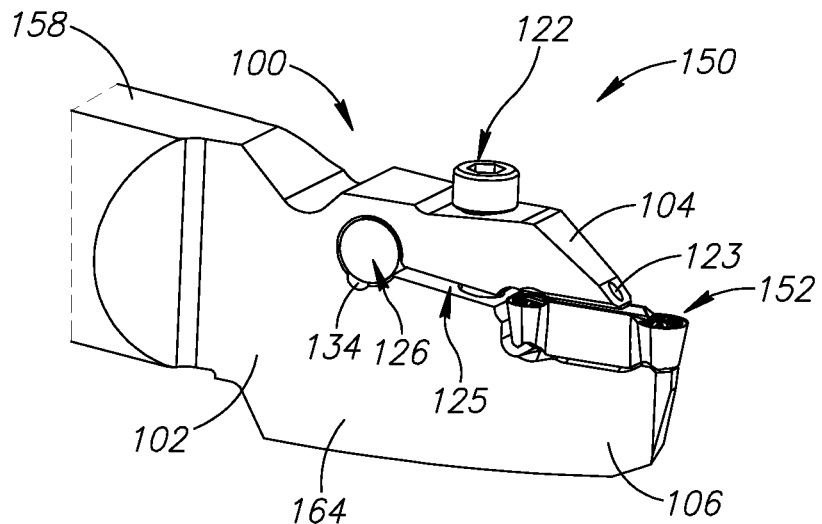
FIG. 1 is a schematic illustration of a cutting tool, according to an embodiment of the disclosed technique.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
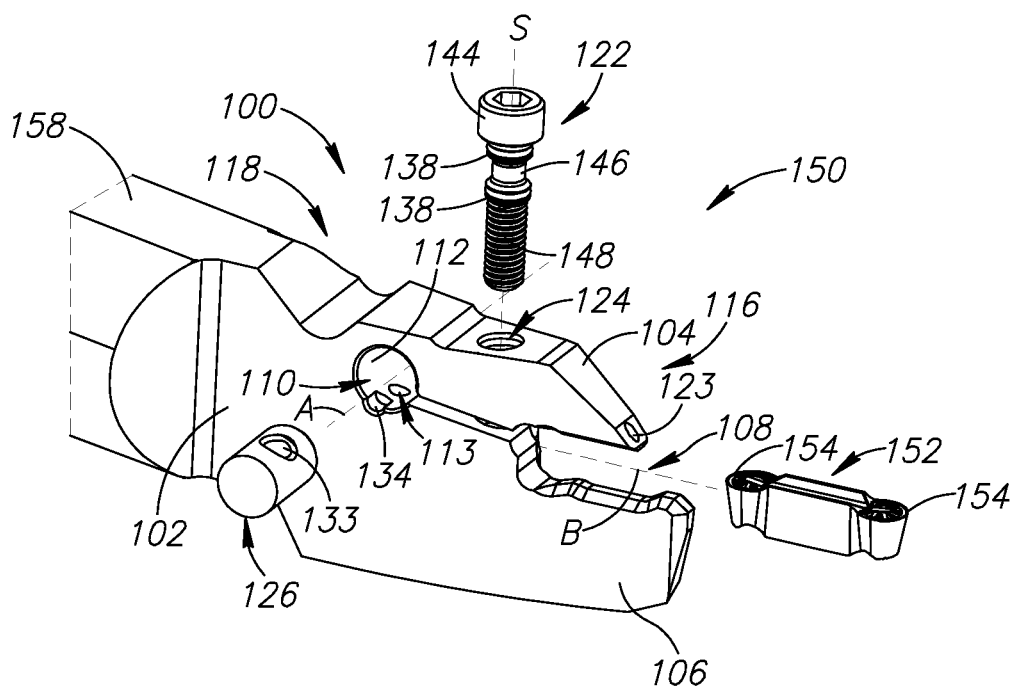
FIG. 2 is an exploded view of the cutting tool of FIG. 1.

Reference is made to FIGS. 1 and 2, depicting a cutting tool 150, in accordance with an embodiment of the present invention, in an assembled position and an exploded position, respectively. The cutting tool 150 includes a cutting tool holder 100 and a cutting insert 152, clamped therein. The cutting tool holder 100 has an internal continuous coolant passage 130 for providing tool coolant fluid C toward the cutting edge of the cutting insert 152, clamped in the cutting tool holder 100.

The cutting tool holder 100 comprises a holder body 102, an upper jaw 104 and a base jaw 106. The upper and base jaws 104, 106 define an insert receiving pocket 108 therebetween, located forward of the holder body 102 and having a longitudinal pocket axis B. The upper jaw 104 and the base jaw 106 are coupled with the holder body 102. In the present embodiment the upper jaw 104 and the base jaw 106 are formed in one-piece unitary construction with the holder body 102. The upper jaw 104 has a front end 116 and a rearward end 118. The upper jaw 104 and the base jaw 106 are spaced apart by a gap 125, ending in a resilience recess 110 located adjacent the rearward end 118 of the upper jaw 104. The resilience recess 110 is bounded by a resilience recess wall 112 extending along a resilience recess axis A, transversely to the pocket axis B. The resilience recess axis A may be perpendicular to the pocket axis B and may even intersect the latter. The resilience recess wall 112 may be substantially cylindrical. Alternatively, the resilience recess wall 112 may have any other shape. The gap 125 and the resilience recess 110 allow the upper jaw 104 to resiliently deflect toward the base jaw 106, upon a vertical force applied thereon. The holder body 102 is coupled with a longitudinal tool shank 158, extending rearwards from the basic body 102. The holder body 102 may be formed in one-piece unitary construction with the tool shank 158. The tool shank 158 may, in turn, be held in a machine shaft.

Figure 3:
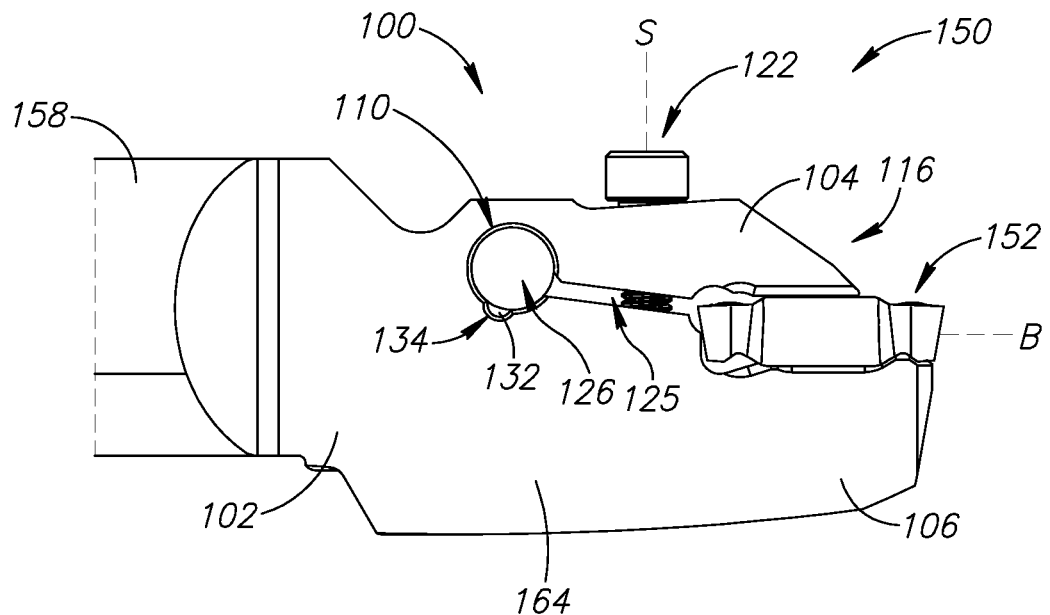
FIG. 3 is a side view of the cutting tool of FIG. 1.
Figure 4:
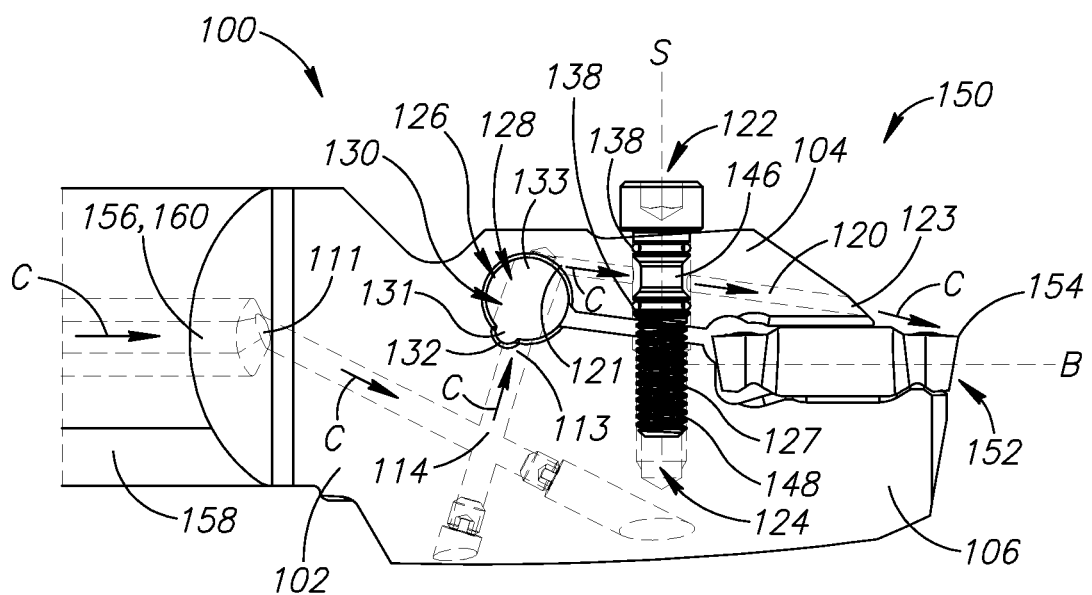
FIG. 4 is a partially transparent side view of the cutting tool of FIG. 1.

Reference is further made to FIGS. 3 and 4, depicting a side view and a partially transparent side view of the cutting tool 150 of FIG. 1, respectively. In the side views, the cutting tool 150 is viewed along the resilience recess axis A. A holder body coolant channel 114 passes through the holder body 102, and has a holder body inlet 111 and a holder body outlet 113. The holder body outlet 113 is located forward of the holder body inlet 111. The holder body outlet 113 opens out to the resilience recess wall 112 (i.e., the holder body outlet 113 is in fluid communication with the resilience recess 110). The holder body inlet 111 opens out to a coolant source 156, providing coolant fluid C into the holder body coolant channel 114. The tool coolant source 156 may be, for example, a shank coolant channel 160, formed longitudinally through the tool shank 158, and opening out in the rear of the tool shank 158. The orientation and the coupling of the holder body coolant channel 114 with the tool coolant source 156 shown in the drawings should be considered as an example only, and not binding in any way to the present invention.

An upper jaw coolant channel 120 passes through the upper jaw 104 and has an upper jaw inlet 121 and an upper jaw outlet 123. The upper jaw inlet 121 opens out to the resilience recess wall 112, spaced apart from the holder body outlet 113 (i.e., the upper jaw inlet 121 is in fluid communication with the resilience recess 110). The upper jaw inlet 121 may be located diametrically opposite of the holder body outlet 113. The upper jaw outlet 123 opens out to the front end 116 of the upper jaw 104.

A screw bore 124 extends vertically along a screw axis S, through the upper jaw 104, crossing the gap 125 into the base jaw 106. In the side view of the cutting tool holder 100 (viewed along the resilience recess axis A, FIGS. 3-4), the screw axis S may be perpendicular to the pocket axis B. In other embodiments, the screw axis S may be angled at an acute angle or an obtuse angle relative to the pocket axis B. The portion of the screw bore 124 extending into the base jaw 106 is a threaded bore portion 127. The screw bore 124 may intersect with the upper jaw coolant channel 120, as depicted in the FIG. 4. The cutting tool holder 100 may also include a fastening screw 122, inserted into the screw bore 124. The fastening screw 122 has a head portion 144, a threading portion 148, and a neck portion 146 extending therebetween. The neck portion 146 is narrower than the head portion 144 and the threading portion 148. The neck portion 146 is also narrower than the screw bore 124, in particular at the upper jaw coolant channel 120. When the fastening screw 122 is fastened into the screw bore 124, the threading portion 148 cooperates with the threaded bore portion 127. Then, the head portion 144 applies a vertical force on the upper jaw 104, forcing it to deflect toward the base jaw 106, and thus clamp the cutting insert 152 in the insert receiving pocket 108. In addition, when the fastening screw 122 is fastened into the screw bore 124, the neck portion 146 thereof is located in the upper jaw coolant channel 120.

The cutting tool holder 100 also includes a compressible tool coolant plug 126, having a plug peripheral surface 142. The plug peripheral surface 142 conforms to the shape of the resilience recess wall 112, such that the coolant plug 126 would fit into the resilience recess 110. The plug peripheral surface 142 may be substantially cylindrical, having two opposing plug end surface 140 between which the plug peripheral surface 142 extends. Alternatively, the plug peripheral surface 142 may have any other shape conforming to the shape of the resilience recess wall 112. For instance, the plug peripheral surface 142 may have a conical shape, in which case only a single plug end surface 140 may be connected to the peripheral surface 142.

A plug coolant channel 128 passes through the coolant plug 126, opening out to the plug peripheral surface 142, at a plug inlet 131 and a plug outlet 133. The tool coolant plug 126 is inserted into the resilience recess 110, such that the plug inlet 131 faces the holder body outlet 113, and the plug outlet 133 faces the upper jaw inlet 121. The plug coolant channel 128 thus provides a fluid path from the holder body coolant channel 114 to the upper jaw coolant channel 120, and forms part of the continuous coolant passage 130 from the coolant source 156 to the upper jaw outlet 123.

The tool coolant plug 126 is formed of a compressible material, such as a polymer (e.g., polyurethane, elastomer, and the like), allowing the tool coolant plug 126 to elastically compress under forces acting on the plug peripheral surface 142. When the upper jaw 104 resiliently deflects toward the base jaw 106, for example, when the fastening screw 122 is fastened, the resilience recess wall 112 grips the plug peripheral surface 142, and compresses the tool coolant plug 126, thereby holding it in place.

The diameter of the plug inlet 131 may be slightly larger than the diameter of the holder body outlet 113, such that the holder body outlet 113 is covered by the plug inlet 131. Similarly, the diameter of the plug outlet 133 is slightly larger than the diameter of the upper jaw inlet 121. When the plug peripheral surface 142 is pressed tight against the resilience recess wall 112, it covers and seals the holder body outlet 113 and the upper jaw inlet 121, and preventing the coolant fluid C from leaking into the resilience recess 110. The coolant fluid C is thus only allowed to flow through the plug inlet 131, and advance through the plug coolant channel 128. Since the tool coolant plug 126 is formed of a compressible material, it does not resist the resilient deflection of the upper jaw 104 toward the base jaw 106. It is understood, however, that the extent of compression of the tool coolant plug 126 will be limited by the clamping of the cutting inset 152 with the underside of the upper jaw front end 116. Therefore, the extent of travel of the front end 116 in clamping the cutting insert 152 is to be taken into account in determining the dimensions of the tool coolant plug 126 relative to the dimensions of the resilience recess 110, along with the compressibility of the tool coolant plug 126 itself.

The tool coolant plug 126 may further include two end plates, each attached to one of the plug end surfaces 140. The end plates are made of a material harder than the material of the tool coolant plug 126, for example, they are made of metal (e.g., aluminum or steel). The end plates cover at least a portion of the plug end surfaces 140, inter alia, in order to protect the tool coolant plug 126, for example, from piercing by metal chips removed from the machined work piece.

The compressible material forming the tool coolant plug 126, such as a polymer (e.g., polyurethane, elastomer, and the like), is durable under typical metal machining temperatures at the resilience recess 110, and rough chemical environment. For example, polyurethane may sustain temperatures typically up to 125° C. without changing its properties. Further, the compressible material is durable under contact with the cutting tool coolant fluid C (e.g., tool coolant emulsion, usually comprising oils, solvents and the like), which may be chemically abrasive. Therefore, the coolant plug 126 is formed to withstand such metal machining conditions, i.e., typical temperatures and possibly chemically abrasive environment. Typical machining conditions may also include considerable friction, vibrations, and the like, and the tool coolant plug 126 is suitable for use in such conditions, as well.

In addition, the compressible material forming the tool coolant plug 126 has a level of rebound resilience. When the upper jaw 104 is not deflected toward the base jaw 106 (e.g., when the fastening screw 122 is released), the tool coolant plug 126 resiliently returns to assume its neutral position within the resilience recess 110.

As noted above, the neck portion 146 of the fastening screw 122 is located in the upper jaw coolant channel 120, and the neck portion 146 is narrower than the screw bore 124 at the upper jaw coolant channel 120. Two sealing rings 138 (e.g., rubber sealing rings) are located on both sides of the neck portion 146, having an outer diameter corresponding to the diameter of the screw bore 124 at the upper jaw coolant channel 120. Thus, when the coolant fluid C advances through the upper jaw coolant channel 120, it may flow around the narrower neck portion 146 of the fastening screw 122. However, the sealing rings 138 seal the screw bore 124 on both sides of the upper jaw coolant channel 120, preventing the coolant fluid C from leaking out of the upper jaw coolant channel 120. The sealing rings 138 may be located in sealing ring grooves, where a first sealing ring groove is formed between the neck portion 146 and the head portion 144, and a second one is formed between the neck portion 146 and the threading portion 148.

Further reference is made to FIGS. 6-9, depicting the tool coolant plug 126 according to different embodiments of the present invention. The tool coolant plug 126 may further include a positioning member 132, to determine the orientation of the tool coolant plug 126, i.e., in order to make sure that the plug inlet 121 is aligned with the holder body outlet 113, and the plug outlet 133 is aligned with the upper jaw inlet 121. The resilience recess wall 112 has a positioning groove 134 formed therein, corresponding to the shape of the positioning member 132.

Figure 6:
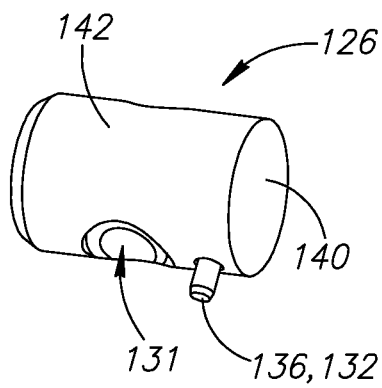
FIG. 6 is a perspective view of a coolant plug according to an embodiment of the disclosed technique.
Figure 7:
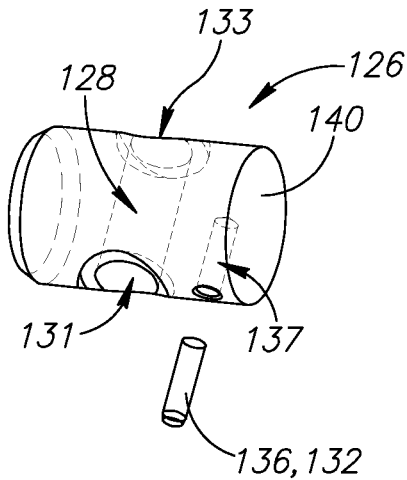
FIG. 7 is a transparent view of the coolant plug of FIG. 6.

FIGS. 6 and 7 depict one embodiment of the tool coolant plug 126, in a perspective view and a perspective transparent view, respectively. In this embodiment, the positioning member 132 is in the form of a positioning pin 136 protruding out of the plug peripheral surface 142, for fitting into the positioning groove 134. The positioning pin 136 is located in a positioning pin bore 137 formed into the tool coolant plug 126 and opening out to the plug peripheral surface 142. The positioning pin bore 137 extends substantially parallel to the plug coolant channel 128.

Figure 8:
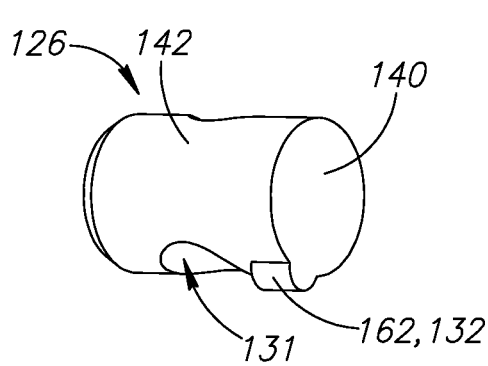
FIG. 8 is a perspective view of a coolant plug according to another embodiment of the disclosed technique.
Figure 9:
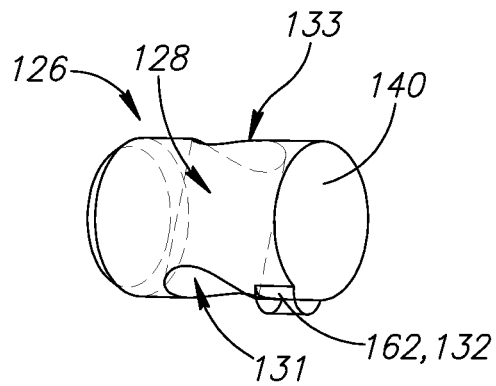
FIG. 9 is a transparent view of the coolant plug of FIG. 8.

FIGS. 8 and 9 depict an alternative embodiment of the tool coolant plug 126, in a perspective view and a perspective transparent view, respectively. In this alternative embodiment, the tool coolant plug 126 has a positioning protrusion 162, extending out of the plug peripheral surface 142. The positioning protrusion 162 may extend, for example, from one of the plug end surfaces 140, toward the plug inlet 131 or the plug outlet 133. In the embodiment depicted in FIGS. 8-9, the positioning protrusion 162 extends from the plug end surface 140 toward the plug inlet 131, along the plug peripheral surface 142, generally perpendicular to the direction of the plug coolant channel 128. The positioning protrusion 162 may be formed in one-piece unitary construction with the plug peripheral surface 142.

When the tool coolant plug 126 is inserted into the resilience recess 110 along the resilience recess axis A, the positioning member 132 (e.g., either the positioning pin 136 or the positioning protrusion 162), slides into the positioning groove 134. The tool coolant plug 126 may be inserted into the resilience recess 110, only when the positioning member 132 slides into the positioning groove 134, thereby determining the orientation of the tool coolant plug 126 relative to the resilience recess 110. In this manner, the orientation of the tool coolant plug 126 is maintained such that the plug inlet 131 faces the holder body outlet 113, and the plug outlet 133 faces the upper jaw inlet 121. This ensures formation of the fluid path from the holder body coolant channel 114 to the upper jaw coolant channel 120.

Furthermore, the positioning member 132 is confined within the positioning groove 134, thus preventing the tool coolant plug 126 from rotating about the resilience recess axis A, relative to the resilience recess wall 112. The positioning member 132 is also stopped against the inner surface of the positioning groove 134, thus preventing the tool coolant plug 126 from moving further into the resilience recess 110, and determining the location of the tool coolant plug 126 along the resilience recess axis A.

The cutting insert 152 has at least one cutting edge 154, to be employed for metal cutting and other metal machining procedures. The cutting insert 152 depicted in the drawings, is an indexable cutting insert with two cutting edges 154. The upper jaw outlet 123 opens out in the direction of the cutting edge 154. When the cutting tool coolant fluid C advances through the coolant passage 130, it is sprayed out of the upper jaw outlet 123, toward the cutting insert 152, and in particular toward the cutting edge 154. During machining operations, the coolant fluid C is required for cooling down the cutting edge 154 and the cutting area of the machined work piece. Additionally, the tool coolant fluid C sprayed out toward the cutting edge 154 may be used for breaking or deflecting metal chips removed from the work piece.

It should be noted that the cutting insert 152 may be any cutting insert suitable for clamping in a tool holder, such as in the insert receiving pocket 108 of the cutting tool holder 100.

The cutting insert 152 depicted in the accompanying drawings is a non-binding example for the cutting insert, and the particulars of the insert receiving pocket 108 are also a non-binding example for the insert receiving pocket. It will be understood that the insert receiving pocket 108 should be formed to be suitable for receiving any particular form of cutting insert.

Figure 5:
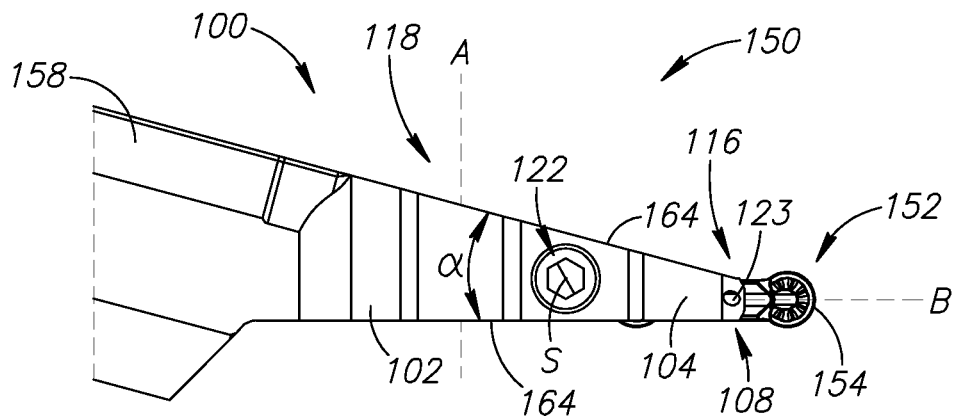
FIG. 5 is a top view of the cutting tool of FIG. 1.

It is noted that for certain machining operations, it is particularly desirable to provide the tool coolant from above the cutting edge, i.e., emerging from the upper clamping jaw. The coolant passage 130 of the cutting tool holder 100 according to the present invention is particularly suitable for cutting tools with limited space, sometimes insufficient for placing additional coolant-providing accessories or members. Reference is now made to FIG. 5, depicting a top view of the cutting tool 150 of FIG. 1, viewed along the screw axis S. The cutting tool holder 100 is tapering, namely narrowing down from the direction of the tool shank 158, toward the insert receiving pocket 108 (i.e., toward the front end 116 of the upper jaw 104). The tool holder 100 has two holder side surfaces 164, extending along the sides of the holder body 102 and the upper and base jaws 104, 106. When viewed along the screw axis S (i.e., in the top view) the holder side surfaces 164 form a taper angle α therebetween. In a particular embodiment of the cutting tool holder 100, the taper angle α may be a 15° angle (i.e., α=15°), as depicted in the drawings as a non-binding example.

The tapering of the cutting tool holder 100 means that the front end 116 is narrower than the holder body 102, which leaves limited space for providing a passage for the cutting tool coolant C, such that would reach the cutting edge 154 from the upper jaw 104 (i.e., from above the cutting edge 154). Accordingly, there is typically insufficient space to form a coolant channel within the holder body 102, located above the resilience recess 110. Similarly, there is a limited possibility to install external coolant-providing members, for example on top of the upper jaw 104, or along the holder side surfaces 164, such that could spray coolant fluid from above the cutting edge 154. Adding such external coolant providing members may limit or obstruct the operation of the cutting tool 150, and is therefore undesirable.

The cutting tool holder 100 in accordance with the present invention takes advantage of the resilience recess 110, using it in the coolant passage 130, for the coolant fluid C to advance from the holder body 102 toward the upper jaw 104. This is achieved by the compressible tool coolant plug 126, fitted into the resilience recess 110, and forming part of the coolant passage 130, without resisting the deflection of the upper jaw 104. Further, due to the limited available space, the upper jaw coolant channel 120 may intersect with the screw bore 124 (i.e., since there is insufficient space for the coolant passage 130 to be spaced apart from the screw bore 124). Still, the coolant fluid C is allowed to flow through the upper jaw coolant channel 120, around the fastening screw 122 and across the screw bore 124, toward the upper jaw outlet 123, thereby also overcoming the limited space constraint.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool holder (100), comprising:
   a holder body (102);
   an upper jaw (104) and a base jaw (106), defining an insert receiving pocket (108) therebetween, located forward of the holder body (102), the upper jaw (104) and the base jaw (106) being coupled with the holder body (102), the upper jaw (104) having a front end (116) and a rearward end (118);
   a resilience recess (110) located adjacent the rearward end (118) of the upper jaw (104), the resilience recess (110) being bounded by a resilience recess wall (112) extending transversely to the insert receiving pocket (108);
   a holder body coolant channel (114) having a holder body outlet (113) opening out to the resilience recess wall (112);
   an upper jaw coolant channel (120) having an upper jaw inlet (121) opening out to the resilience recess wall (112) and spaced apart from the holder body outlet (113), and an upper jaw outlet (123) opening out to the front end (116) of the upper jaw (104); and
   a tool coolant plug (126) having a plug made of an elastically compressible material peripheral surface (142) and a plug coolant channel (128) passing through the elastically compressible material of the tool coolant plug (126) and opening out to the plug peripheral surface (142) at a plug inlet (131) and a plug outlet (133);
   wherein the tool coolant plug (126) is located within the resilience recess (110), with the plug inlet (131) facing the holder body outlet (113), and the plug outlet (133) facing the upper jaw inlet (121), and
   when the upper jaw (104) resiliently deflects toward the base jaw (106), the resilience recess wall (112) compresses the tool coolant plug (126), and the plug coolant channel (128) forms a fluid path from the holder body coolant channel (114) to the upper jaw coolant channel (120).

2. The cutting tool holder (100) according to claim 1, wherein the upper jaw (104) and the base jaw (106) are formed in one-piece unitary construction with the holder body (102).

3. The cutting tool holder (100) according to claim 1, wherein the resilience recess wall (112) and the plug peripheral surface (142) are substantially cylindrical.

4. The cutting tool holder (100) according to claim 1, wherein the insert receiving pocket (108) has a longitudinal pocket axis (B), and the resilience recess wall (112) extends along a resilience recess axis (A), transversely to the pocket axis (B).

5. The cutting tool holder (100) according to claim 1, wherein the tool coolant plug (126) is formed of a compressible material.

6. The cutting tool holder (100) according to claim 5, wherein the tool coolant plug (126) is formed of polyurethane.

7. The cutting tool holder (100) according to claim 1, wherein:
   the tool coolant plug (126) further comprises a positioning member (132) protruding from the plug peripheral surface (142),
   the resilience recess (110) has a positioning groove (134) formed in the resilience recess wall (112), corresponding to the shape of the positioning member (132) and
   the tool coolant plug (126) is inserted into the resilience recess (110), with the positioning member (132) sliding into the positioning groove (134).

8. The cutting tool holder (100) according to claim 7 wherein:

the tool coolant plug (126) further includes a positioning pin bore (137), opening out to the plug peripheral surface (142), and the positioning member (132) is a positioning pin (136) inserted into the positioning pin bore (137), and protruding from the plug peripheral surface (142).

9. The cutting tool holder (100) according to claim 7 wherein the positioning member (132) is a positioning protrusion (162) extending out of the plug peripheral surface (142), the positioning protrusion (162) formed in one-piece unitary construction with the plug peripheral surface (142).

10. The cutting tool holder (100) according to claim 9, wherein the tool coolant plug (126) has at least one end surface (140) connected to the plug peripheral surface (142); and the positioning protrusion (162) extends from the at least one end surface (140), toward one of the plug inlet (131) and the plug outlet (133), along the plug peripheral surface (142).

11. The cutting tool holder (100) according to claim 10, wherein the positioning protrusion (162) extends generally perpendicular to the direction of the plug coolant channel (128).

12. The cutting tool holder (100) according to claim 7, wherein the positioning member (132) prevents the tool coolant plug (126) from rotating relative to the resilience recess wall (112), and from moving further into the resilience recess (110).

13. The cutting tool holder (100) according to claim 1, further comprising a screw bore (124) passing vertically through the upper jaw (104) and extending into the base jaw (106).

14. The cutting tool holder (100) according to claim 13, wherein the screw bore (124) intersects with the upper jaw coolant channel (120).

15. The cutting tool holder (100) according to claim 14, further comprising a fastening screw (122), inserted into the screw bore (124), the fastening screw (122) having a head portion (144), a threading portion (148), and a neck portion (146) extending therebetween, the neck portion (146) being narrower than the head portion (144) and the threading portion (148).

16. The cutting tool holder (100) according to claim 15, wherein when the fastening screw (122) is fastened into the screw bore (124), the neck portion (146) is located in the upper jaw coolant channel (120).

17. The cutting tool holder (100) according to claim 16, wherein the fastening screw (122) has two sealing rings (138) located on both sides of the neck portion (146).

18. The cutting tool holder (100) according to claim 1, wherein the upper jaw (104) and the base jaw (106) taper in a direction of the front end (116) of the upper jaw (114), in a top view of the cutting tool holder (100).

19. A cutting tool (150) comprising the cutting tool holder (100) according to claim 1, and a cutting insert (152) clamped in the insert receiving pocket (108) of the cutting tool holder (100).

20. The cutting tool (150) according to claim 19, wherein the cutting insert (152) has a cutting edge (154), and the upper jaw outlet (123) opens out in the direction of the cutting edge (154).

21. The cutting tool (150) according to claim 20 connected to a coolant source (156), wherein a cutting tool coolant fluid (C) from the coolant source (156) passes through the holder body coolant channel (114), through the plug coolant channel (128), through the upper jaw coolant channel (120), and toward the cutting insert (152).

22. The cutting tool (150) according to claim 21, wherein the cutting tool coolant fluid (C) is sprayed out of the upper jaw outlet (123) toward the cutting edge (154) of the cutting insert (152).

23. A cutting tool holder (100), comprising:
a holder body (102);
an upper jaw (104) and a base jaw (106) coupled with the holder body (102), the upper jaw (104) having a front end (116) and a rearward end (118);
a resilience recess (110) located adjacent the rearward end (118) of the upper jaw (104);
a holder body coolant channel (114) having a holder body outlet (113) in fluid communication with the resilience recess (110);
an upper jaw coolant channel (120) having an upper jaw inlet (121) in fluid communication with the resilience recess (110);
compressible tool coolant plug (126) formed of a an elastically compressible material and located within the resilience recess (110); and
a plug coolant channel (128) formed in the elastically compressible material and passing therethrough; wherein
when the upper jaw (104) resiliently deflects toward the base jaw (106), the tool coolant plug (126) is compressed and the plug coolant channel (128) forms a fluid path from the holder body coolant channel (114) to the upper jaw coolant channel (120).

\* \* \* \* \*